UNITED STATES PATENT OFFICE.

WILLIAM HARRISON GIBSON, OF WANGANUI, NEW ZEALAND, ASSIGNOR OF ONE-HALF TO HENRY THOMAS SAVAGE, OF WANGANUI, NEW ZEALAND.

COMPOSITION FOR BRANDING CATTLE, HORSES, AND THE LIKE.

1,101,795.  Specification of Letters Patent.  Patented June 30, 1914.

No Drawing.  Application filed May 7, 1913.  Serial No. 766,240.

*To all whom it may concern:*

Be it known that I, WILLIAM HARRISON GIBSON, a citizen of the Dominion of New Zealand, and residing at Wanganui, in the Provincial District of Wellington, in the Dominion of New Zealand, have invented certain new and useful Improvements in Improved Compositions for Branding Cattle, Horses, and the like, of which the following is a specification.

This invention relates to a composition used for branding animals by removing the hair and provides a composition whereby the hair is permanently removed with little or no injury to the hide or suffering to the animals.

The composition includes turpentine, coal tar, sulfid of barium and potassium hydroxid. These ingredients are the active agents in the branding operation. To these active agents we add glycerin, sulfur, charcoal and oxid of zinc, these ingredients having the object of keeping the composition in better condition ready for use and of reducing the irritation which the active agents would otherwise set up when employing the composition.

The sulfid of barium and coal tar are first mixed together, a second mixture of potassium hydroxid and turpentine is then made and these two mixtures are added together and thoroughly amalgamated by heating.

The ingredients are used in the following proportions:—

Sulfid of barium_____ 16 ounces by weight.
Coal tar_____ 32   "    "    "
Turpentine_____ 32   "    "    "
Potassium hydroxid___ 16   "    "    "

In manufacturing the composition the sulfid of barium and coal tar are stirred together for a period of fifteen to twenty minutes, that is until the sulfid of barium is well mixed. This mixture is allowed to stand for fifteen to thirty minutes. The turpentine and potassium hydroxid are stirred together until all or nearly all the potassium hydroxid has dissolved.

The two mixtures thus obtained are mixed together by stirring thoroughly. The combined mixture is then put on a slow fire, and stirred continuously until the composition is brought by the heat to a consistency of treacle. The temperature of the composition must not be raised above 100 degrees Fahrenheit.

As the active agents, sulfid of barium, coal tar, turpentine and potassium hydroxid vary in quality, it is difficult to reduce them to the consistency of treacle and small particles being undissolved would irritate the skin of an animal. Small quantities of glycerin, sulfur, charcoal and oxid of zinc are added to the composition until a consistency of treacle is obtained and so that the whole of the above ingredients are dissolved. The proportions of these ingredients, glycerin, sulfur, charcoal and oxid of zinc will vary with the quality of the active ingredients.

What I do claim and desire to secure by Letters Patent of the United States is:—

A composition of matter for branding animals comprising, substantially, sulfid of barium sixteen ounces, coal tar thirty-two ounces, turpentine thirty-two ounces, potassium hydroxid sixteen ounces, and small quantities of glycerin, sulfur, charcoal and oxid of zinc.

In testimony whereof I have signed my name to this specification in the presence of two witnesses.

WILLIAM HARRISON GIBSON.

Witnesses:
RUTHECHIE LAULILEK WANGANIN,
SIDNEY HAROLD SMITH.

---

Copies of this patent may be obtained for five cents each, by addressing the "Commissioner of Patents, Washington, D. C."